Sept. 22, 1959 R. CROCE 2,905,187
GARDEN UMBRELLA
Filed July 18, 1957

INVENTOR.
Robert Croce
BY
Bacon & Thomas
ATTORNEYS

2,905,187

GARDEN UMBRELLA

Robert Croce, Chevy Chase, Md.

Application July 18, 1957, Serial No. 672,772

1 Claim. (Cl. 135—46)

This invention relates to garden umbrellas, and particularly to garden umbrellas capable of adjustment and arranged on a support whereby the umbrella may be positioned over a table or the like without having a post extending through the table.

In general, the invention comprises an umbrella having an upright supporting post and a horizontal arm carried by said post, adjustable about its own longitudinal axis. The horizontal arm is provided with a pivoted portion defining a canopy supporting staff capable of being arranged to extend vertically whereby the umbrella canopy may be arranged to shade an area laterally displaced from the supporting post.

It is therefore an object of this invention to provide a garden umbrella and means whereby the area shaded is free of all supporting posts or the like.

Another object of the invention is to provide a garden umbrella attaining the object above set forth and wherein the umbrella canopy is capable of substantially universal tilting adjustment.

Still another object of the invention is to provide a garden umbrella as set forth above which is sturdy and simple in construction yet reliable in operation.

Additional and further objects and advantages will become apparent to those skilled in the art as the description proceeds in connection with the accompanying drawings, wherein.

Figure 1:
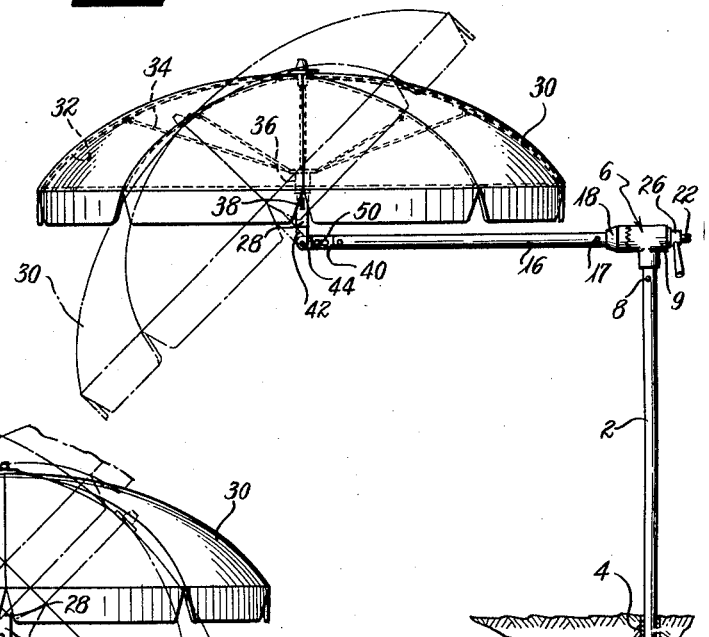
Fig. 1 is a side elevational view of a garden umbrella embodying the present invention.

As shown in the drawings, an upright tubular post 2 is mounted in a suitable socket 4 in the ground whereby it may be readily removed for storage or inserted for support of a garden umbrella to be described. The upper end of the post 2 is provided with a fitting 6 having a portion 7 receivable in the upper end of the post 2, which is shown as a hollow tube, and fixed therein by means of a pin 8 or the like. The fitting 6 is formed with a substantially horizontal head portion 9 having a bore 10 therethrough. One end of the head 9 of the fitting 6 defines a planar shoulder 12 but the other end thereof is provided with an annular series of serrations 14. The serrations 14 extend in a generally radial direction inwardly to the bore 10.

A tubular arm 16 is provided with an end fitting 18 secured to the arm by pin 17 and having radial serrations 20 mating with the serrations 14 on fitting 6. The fitting 18 is further provided with a pivot member or bolt 22 extending therefrom and through the bore 10 in fitting 6. The pivot member 22 may be provided with a head 24 thereon embedded in the material of fitting 18, which is preferably formed of cast aluminum, as is the fitting 6. The pivot member 22 extends completely through and beyond the head 9 of fitting 6 and its outer end portion is threaded as shown. A handled nut 26 threadedly engages the outer end of pivot member 22 and bears against the planar end face 12 of head 9 to hold the serrations 14 and 20 in positively interlocking relation.

The other or outer end of arm 16 is provided with a pivot connection to an upright staff 28. The staff 28 has a suitable foldable umbrella canopy 30 mounted thereon. As shown, the canopy 30 includes the usual ribs 32 pivoted to the staff 28 at the upper end thereof, brace members 34 pivoted at one end to an intermediate portion of the ribs 32, and at their other ends to a sliding sleeve 36 slidably mounted on the staff 28. A suitable releasable latch 38 is provided to hold the sleeve 36 in the upper position shown wherein the canopy 30 is extended.

Figure 4:
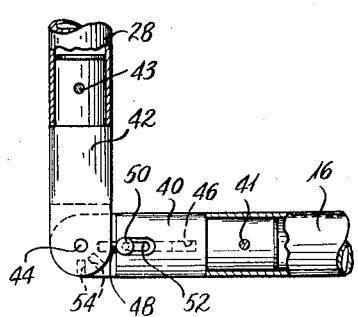
Fig. 4 is an enlarged fragmentary view of another portion of Fig. 1 with certain parts shown in section.

The pivot joint between the arm 16 and the staff 28 is shown in detail in Fig. 4. The arm 16 and staff 28 are each of hollow tubular construction and are provided, respectively, with fittings 40 and 42 at their adjacent ends. The fittings 40 and 42 are fixed to arm 16 and staff 28 by pins 41 and 43, respectively, and are pivotally joined for relative pivotal adjustment about the axis of a pin 44 extending transverse to both the arm 16 and staff 28. The fitting 40 is provided with a bore 46 slidably receiving a pin 48 having an actuating thumb piece 50 extending outwardly through a slot 52 in fitting 40. The fitting 42 is provided with a plurality of openings 54 extending radial to the pin 44 and arranged to selectively receive the sliding pin 48. Thus the staff 28 may be locked in the position shown (Fig. 4) wherein it is perpendicular to arm 16 or it may be adjusted to a position where it extends in axial alignment with arm 16 and may further be adjusted to at least one position intermediate the two positions described.

Figure 2:
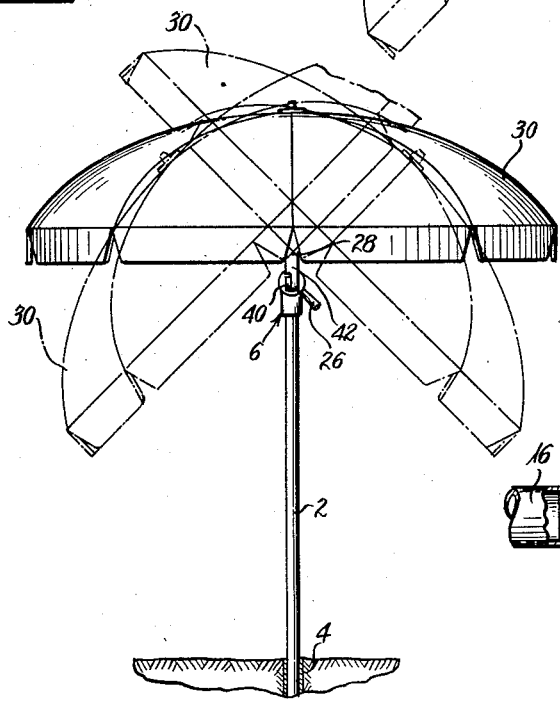
Fig. 2 is an end view of the umbrella of Fig. 1 as viewed from the left side thereof.
Figure 3:
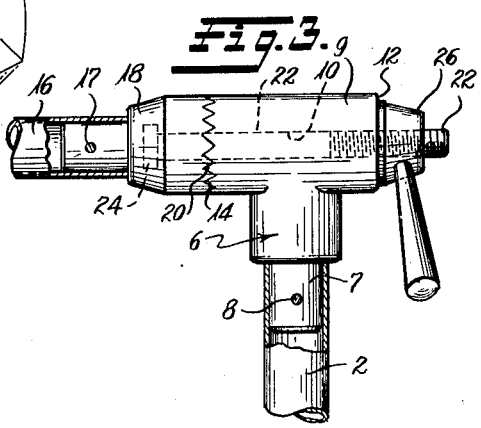
Fig. 3 is an enlarged fragmentary view of a portion of Fig. 1, with certain parts shown in section.

By loosening the handled nut 26 sufficiently to permit axial movement of the arm 16 and its pivot member 22 sufficiently to disengage the serrations 14 and 20, the arm 16 may be pivotally adjusted about its axis to tilt the canopy 30 in the manner suggested by dotted line in Fig. 2 and nut 26 then may be tightened to lock the canopy in the desired position. Obviously the canopy may be adjusted to tilt positions other than those shown, from a position where the staff 28 extends horizontally to either side, or any intermediate position. In addition, as is obvious, the staff 28 may be pivotally adjusted to the intermediate position described, relative to arm 16, as shown in dotted line in Fig. 1. With the canopy tilted to the position shown in dotted line in Fig. 1, the arm 16 may be pivotally adjusted about its axis to place the canopy 30 in a still further plurality of positions. It is further contemplated that the post 2 be rotatable in the socket 4 to permit arm 16 to be swung in a horizontal plane and thus permit positioning the canopy 30 in almost every possible position within a wide area around the post 2.

The canopy 30 is preferably of conventional construction and substantially circular in horizontal outline. The arm 16 is at least as long as the radius of the canopy 30 and is preferably of somewhat greater length, as shown. By proportioning the parts as described, the entire area below the canopy 30 in any of its positions of adjustment can be completely occupied without interference from the supporting post 2.

When staff 28 is aligned with arm 16, the canopy 30 may be folded to collapsed condition by releasing latch 38 and sliding sleeve 36 over the joint between the staff and arm and onto arm 16 to the necessary extent.

While a single specific embodiment of the invention has been shown and described herein, it is to be understood that such embodiment is merely illustrative of the invention. The invention may encompass other modifications falling within the scope of the appended claim.

I claim:

A garden umbrella comprising, an upright post, an arm extending substantially horizontally from the upper end of said post, means mounting said arm on said post for rotary adjustment about a horizontal axis extending longitudinally of said arm, a staff carried by and extending transverse to said arm at a position remote from said post, and an umbrella canopy coaxially mounted on the end of said staff, said means comprising a fitting on said post having a horizontal bore therethrough and axially facing serrations surrounding one end of said bore, said arm having an end portion provided with axially facing serrations interlocking with those on said fitting, a pivot member on said arm, axially aligned therewith, and extending through said bore, and selectively releasable means fixedly holding said serrations in interlocking relation.

References Cited in the file of this patent

UNITED STATES PATENTS

| | | |
|---|---|---|
| Re. 9,829 | Gibson | Aug. 9, 1881 |
| 232,213 | Shemeley | Sept. 14, 1880 |
| 375,953 | Richter | Jan. 3, 1888 |
| 555,025 | Ruffhead et al. | Feb. 18, 1896 |
| 558,296 | McDonald | Apr. 14, 1896 |
| 2,559,421 | Garrett | July 3, 1951 |

FOREIGN PATENTS

| | | |
|---|---|---|
| 286,294 | Switzerland | Feb. 2, 1953 |
| 865,945 | Germany | Feb. 5, 1953 |
| 1,030,826 | France | Mar. 18, 1953 |